(12) United States Patent
Mizutani et al.

(10) Patent No.: US 8,416,119 B2
(45) Date of Patent: Apr. 9, 2013

(54) WEATHER RADAR APPARATUS AND SIGNAL PROCESSING METHOD THEREOF

(75) Inventors: Fumihiko Mizutani, Kawasaki (JP);
Masakazu Wada, Kawasaki (JP);
Hiroshi Ishizawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 264 days.

(21) Appl. No.: 12/825,740

(22) Filed: Jun. 29, 2010

(65) Prior Publication Data

US 2011/0063164 A1 Mar. 17, 2011

(30) Foreign Application Priority Data

Sep. 11, 2009 (JP) ................. 2009-210923

(51) Int. Cl.
*G01S 13/95* (2006.01)
(52) U.S. Cl.
USPC ........... 342/26 R; 342/159; 342/194; 342/196
(58) Field of Classification Search ............. 342/26 R, 342/26 A–26 D, 21, 115–116, 159–162, 194, 342/196
See application file for complete search history.

(56) References Cited

U.S. PATENT DOCUMENTS

| 5,473,332 | A | 12/1995 | James et al. | |
| 5,485,160 | A * | 1/1996 | Suganuma | 342/195 |
| 6,456,227 | B2 | 9/2002 | Wada et al. | |
| 2003/0210179 | A1 | 11/2003 | Dizaji et al. | |
| 2005/0203730 | A1 | 9/2005 | Aoki et al. | |
| 2006/0049978 | A1 * | 3/2006 | Siegel | 342/159 |
| 2010/0026559 | A1 * | 2/2010 | Siegel | 342/159 |

FOREIGN PATENT DOCUMENTS

| JP | 6-34747 | 2/1994 |
| JP | 2002-139565 | 5/2002 |
| JP | 2006-177671 | 7/2006 |

OTHER PUBLICATIONS

Lo, T.; Litva, J.; , "Early results of multipath measurements on Lake Ontario (low angle radar tracking)," Antennas and Propagation Society International Symposium, 1989. AP-S. Digest , vol., No., pp. 819-822 vol. 2, Jun. 26-30, 1989.*
On the minimum useful elevation angle for weather surveillance radar scans , Paul L Smith. Journal of Atmospheric and Oceanic Technology. Boston:Jun. 1998. vol. 15, Iss. 3, p. 841-843 (3 pp.).*
On the minimum useful elevation angle for weather surveillance radar scans Paul L Smith. Journal of Atmospheric and Oceanic Technology. Boston:Jun. 1998. vol. 15, Iss. 3, p. 841-843.*
Hydrologic validation of real-time weather radar VPR correction methods , Klyszejko, Erika Suzanne. Proquest Dissertations and Theses 2007. Section 1141, Part 0543 276 pages; [M.A.Sc. dissertation].Canada: University of Waterloo (Canada); 2007. Publication No. AAT MR34333.*
U.S. Appl. No. 12/700,209, filed Feb. 2, 2010, Fumihiko Mizutani, et al.

(Continued)

*Primary Examiner* — John B Sotomayor
(74) *Attorney, Agent, or Firm* — Oblon, Spivak, McClelland, Maier & Neustadt, L.L.P.

(57) ABSTRACT

According to one embodiment, a weather radar apparatus includes a transmitting/receiving unit configured to transmit a radar wave to an observation target and receive a reflected wave, a distribution unit configured to distribute a received signal of the reflected wave to a main path and at least another path, an extraction unit configured to extract, from a signal of the other path, an interference wave signal extracted from another radio station, and a removing unit configured to remove the interference wave signal extracted from a signal of the main path.

12 Claims, 5 Drawing Sheets

OTHER PUBLICATIONS

U.S. Appl. No. 12/700,228, filed Feb. 4, 2010, Fumihiko Mizutani, et al.
Shoichiro Fukao, et al., "Remote Sensing of Weather and Atmospheric Radar", ISBN 4-87698-653-3, 2005, 1 page.
Extended European Search Report issued Feb. 1, 2012, in Patent Application No. 10167002.4.
J. G. Fielding, et al., "Adaptive Interference Cancellation in Radar Systems", International Radar Conference, XP 2095544, Oct. 25, 1977, pp. 212-217.
Office Action mailed Nov. 13, 2012 in Japanese Patent Application No. 2009-210923 filed Sep. 11, 2009 (with English translation).

* cited by examiner

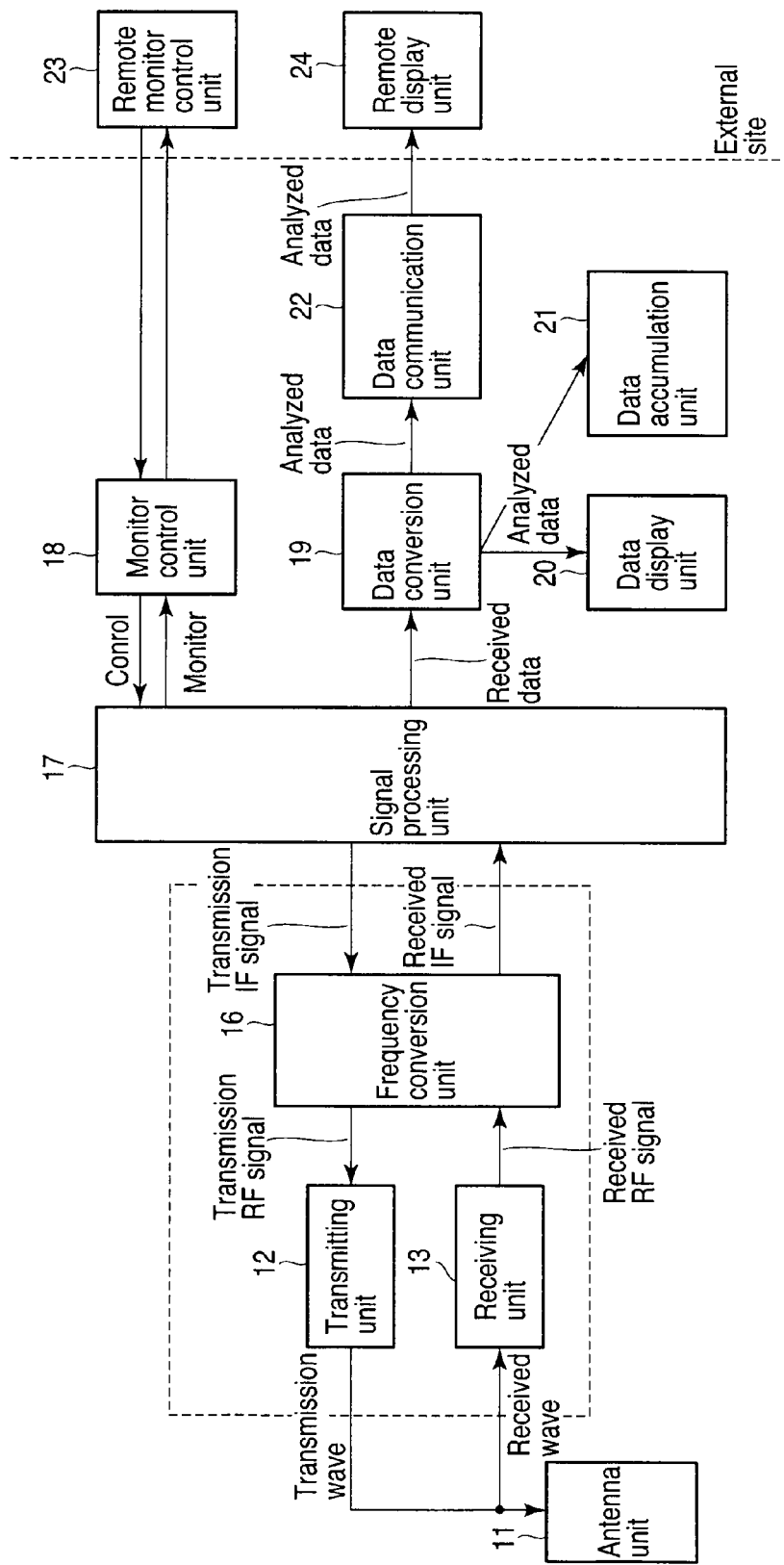
F I G. 1

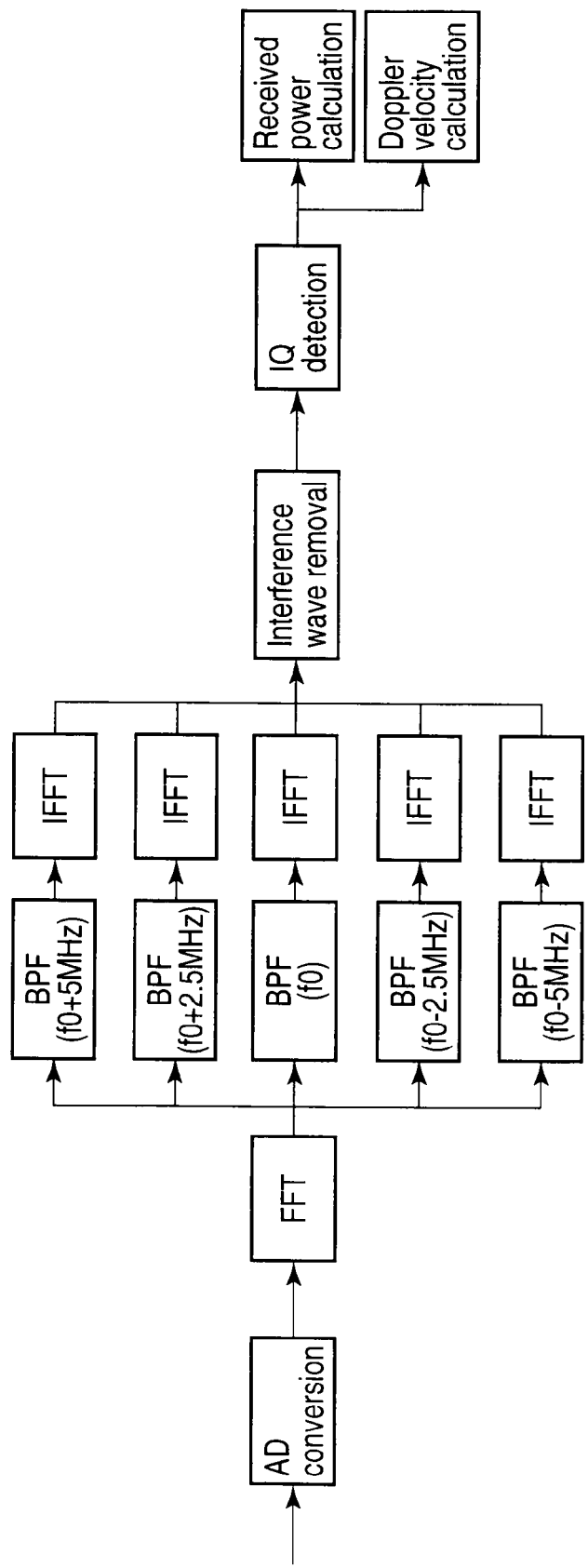
F I G. 5

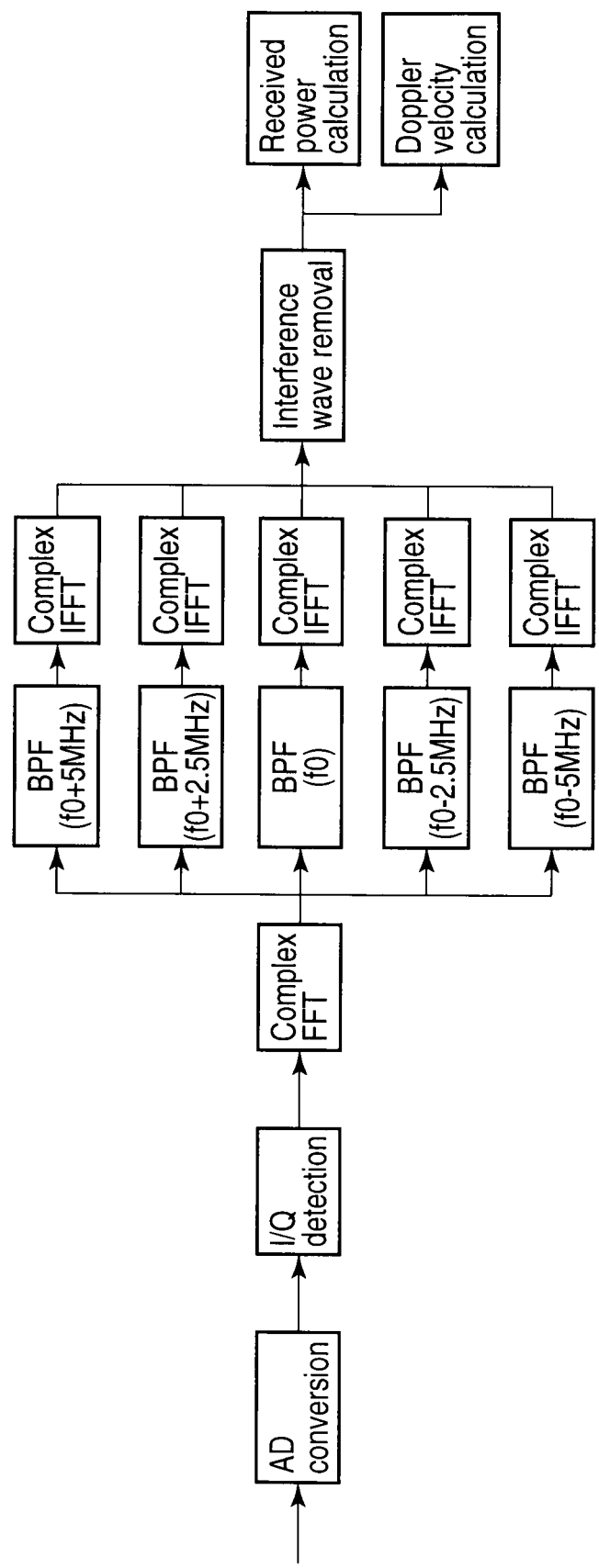
F I G. 6

WEATHER RADAR APPARATUS AND SIGNAL PROCESSING METHOD THEREOF

CROSS-REFERENCE TO RELATED APPLICATIONS

This application is based upon and claims the benefit of priority from Japanese Patent Application No. 2009-210923, filed Sep. 11, 2009; the entire contents of which are incorporated herein by reference.

FIELD

Embodiments described herein relate generally to a weather radar apparatus and a signal processing method thereof.

BACKGROUND

A transmission frequency used in a radar apparatus is determined in accordance with the application purpose. In general, when a high resolution or accuracy is required, a high frequency is used. A weather radar apparatus uses, as its transmission frequency, S band, C band or X band in the subdivisions of frequency. The frequencies are assigned in a predetermined frequency step such as 2.5 MHz based on the licensing system. However, if a self station and another station, which use different transmission frequencies, are installed at close locations, radio interference may occur between signals received by the two stations. If a signal from another radar site or the like is mixed into a received signal as an interference wave, the sensitivity of the received signal lowers, and the received power or Doppler velocity cannot accurately be measured.

Note that as a known reference associated with the present application, Jpn. Pat. Appln. KOKAI Publication No. 2002-139565 is disclosed.

BRIEF DESCRIPTION OF THE DRAWINGS

FIG. 1 is a block diagram showing the arrangement of a weather radar apparatus according to an embodiment;

FIG. 5 is a block diagram showing the processing system of a signal processing apparatus according to Example 3; and FIG. 6 is a block diagram showing the processing system of a signal processing apparatus according to Example 4.

DETAILED DESCRIPTION

Figure 2:
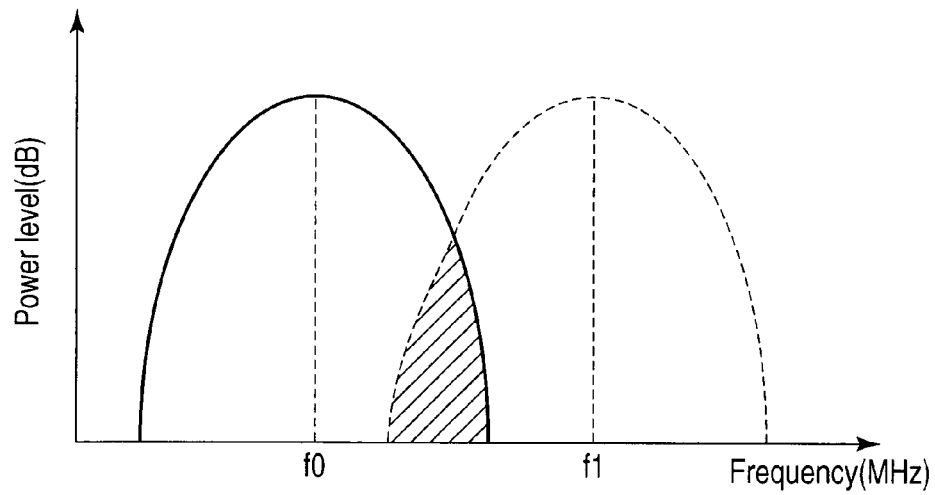
FIG. 2 is a conceptual view showing interference caused by an interference wave.

In general, according to one embodiment, a weather radar apparatus includes a transmitting/receiving unit, a distribution unit, an extraction unit, and a removing unit. The transmitting/receiving unit is configured to transmit a radar wave to an observation target and receive a reflected wave. The distribution unit is configured to distribute a received signal of the reflected wave to a main path and at least another path. The extraction unit is configured to extract, from a signal of the other path, an interference wave signal extracted from another radio station. The removing unit is configured to remove the interference wave signal extracted from a signal of the main path.

An embodiment will now be described in detail with reference to the accompanying drawing. Note that the same reference numerals denote the same or corresponding parts throughout the drawing.

FIG. 1 is a block diagram showing the arrangement of a weather radar apparatus according to this embodiment. The weather radar apparatus includes an antenna unit 11, transmitting unit 12, receiving unit 13, frequency conversion unit 16, signal processing unit 17, monitor control unit 18, data conversion unit 19, data display unit 20, data accumulation unit 21, data communication unit 22, remote monitor control unit 23, and remote display unit 24.

In the above arrangement, when a monitor control signal from the remote monitor control unit 23 is sent to the signal processing unit 17 via the monitor control unit 18, the signal processing unit 17 generates digital data of a seed signal stored inside, D/A-converts it, and sends it to the frequency conversion unit 16 as a transmission IF signal. The frequency conversion unit 16 up-converts the transmission IF signal into a transmission RF signal.

The transmission RF signal obtained by the frequency conversion unit 16 is amplified by the transmitting unit 12 into a transmission power observable at a long distance. The antenna unit 11 outputs the amplified transmission power into air.

Precipitation in a space reflects the transmitted wave. The antenna unit 11 captures the reflected wave, and the receiving unit 13 receives it. The frequency conversion unit 16 converts it into an IF signal and sends the signal to the signal processing unit 17.

The signal processing unit 17 has a function of A/D-converting the received IF signal, detecting I/Q waves, and calculating the received power and Doppler velocity. The signal processing unit 17 also has an interference wave removing function of reducing the influence of radio interference from another radar site or the like and improving the sensitivity of the received signal. The interference wave removing function will be described later in detail.

The data conversion unit 19 calculates the rainfall rate from the received power obtained by the signal processing unit 17, and corrects the Doppler velocity. The data display unit 20 displays the data analyzed by the data conversion unit 19. The data accumulation unit 21 accumulates the data analyzed by the data conversion unit 19. The data communication unit 22 transfers the data analyzed by the data conversion unit 19 to the outside of the radar site via a communication means. The remote display unit 24, for example, displays or analyzes the data transferred from the radar site. The remote monitor control unit 23 can monitor the radar apparatus from a remote site, like the monitor control unit 18.

Interference wave removal processing by the signal processing unit 17 in FIG. 1 will be described next in accordance with each example.

FIG. 2 is a conceptual view showing interference caused by an interference wave. Referring to FIG. 2, the solid line indicates the received signal of the self station when a transmission frequency f0 is used. The broken line indicates the received signal of another station when a transmission frequency f1 (for example, f1=f0+2.5 MHz) is used. The hatched portion in FIG. 2 is obtained as a signal in which an interference wave from another station is mixed. To improve the sensitivity of the received signal, the unnecessary interference wave needs to be removed.

Example 1

Figure 3:
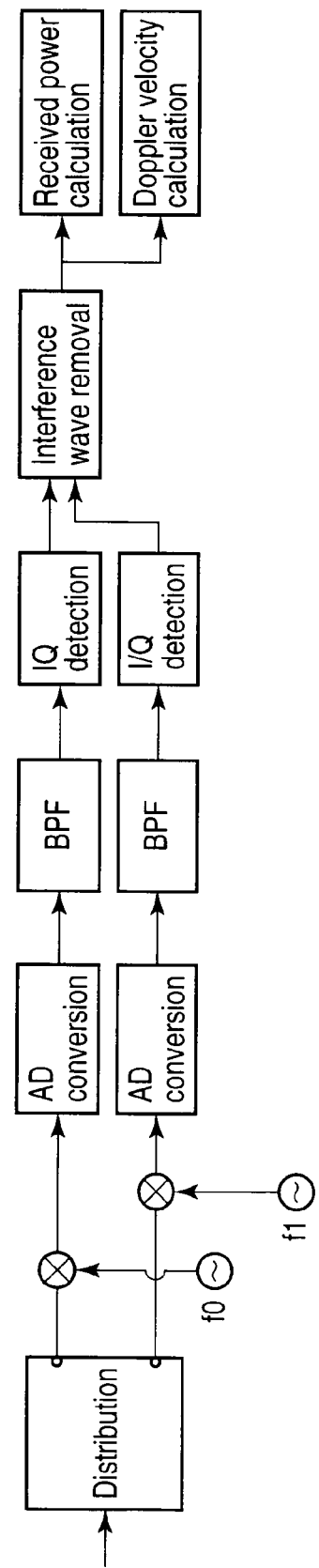
FIG. 3 is a block diagram showing the processing system of a signal processing apparatus according to Example 1.

FIG. 3 illustrates the processing system of a signal processing unit 17 according to Example 1. A received IF signal of 10-MHz band is distributed to two paths. The oscillation signal of transmission frequency f0 of the self station is mixed into the main path. The oscillation signal of transmission frequency f1 of the other station is mixed into the other path. The received IF signals are A/D-converted based on a 60-MHz clock. Each digitized received data passes through a band-pass filter (BPF) of, for example, 1.2-MHz band so as to perform waveform shaping. Received data corresponding to the transmission frequencies f0 and f1 are thus extracted. The extracted received data corresponding to each of the transmission frequencies f0 and f1 is separated into an I (In-phase) component signal and a Q (Quadrature) component signal by quadrature detection, and undergoes interference wave removal.

The interference wave removal is performed in accordance with, for example, the following procedure. As the first procedure, when data equal to or larger than a threshold (for example, −100 dBm) is calculated in the received data of transmission frequency f1 of the other station, it is regarded as the arrival of an interference wave, and IQ signals corresponding to the transmission frequency f0 of the self station are removed from the azimuth averaging target. As the second procedure, the removal target data is replaced with immediately preceding data. As the third procedure, IQ data corresponding to the transmission frequency f0 of the self station of the removal target hit and IQ data corresponding to the transmission frequency f1 of the other station are subjected to FFT (Fast Fourier Transform) on a complex plane. Using the frequency spectrum of the transmission wave of the other station, which is acquired in advance from the spectral waveform of the self station, the frequency spectrum of the interference wave is calculated from the input level of the transmission frequency f1 of the other station. After the data corresponding to the interference wave is subtracted for each frequency, IFFT (Inverse Fast Fourier Transform) is performed. Note that the amplitude or phase is corrected as needed upon subtraction processing.

The received power and Doppler velocity are calculated using the IQ signals that have thus undergone the interference wave removal.

Example 2

Figure 4:
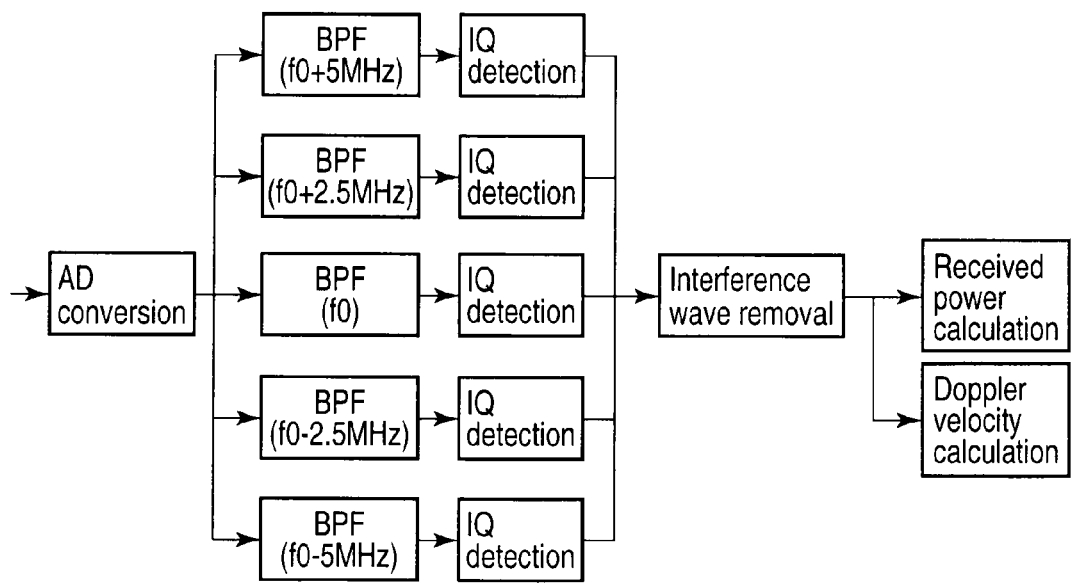
FIG. 4 is a block diagram showing the processing system of a signal processing apparatus according to Example 2.

FIG. 4 illustrates the processing system of a signal processing unit 17 according to Example 2. Interference wave frequencies are assumed to be, for example, f0+2.5 MHz, f0+5 MHz, f0−2.5 MHz, and f0−5 MHz.

A received IF signal of 10-MHz band is A/D-converted based on a 60-MHz clock. The digitized signal is distributed to five paths. The signal of the main path passes through a BPF having a pass characteristic for the 1.2-MHz band corresponding to the transmission frequency f0 of the self station, and then undergoes quadrature detection. The signals of the remaining four paths pass through BPFs having a pass characteristic for the bands corresponding to the interference wave frequencies f0+2.5 MHz, f0+5 MHz, f0−2.5 MHz, and f0−5 MHz, and then undergo quadrature detection. According to the same procedure as in Example 1, data determined to be an interference wave is removed or subtracted from IQ signals corresponding to the transmission frequency f0 of the self station based on IQ signals corresponding to the interference wave frequencies f0+2.5 MHz, f0+5 MHz, f0−2.5 MHz, and f0−5 MHz.

Example 3

FIG. 5 illustrates the processing system of a signal processing unit 17 according to Example 3. As in Example 2, interference wave frequencies are assumed to be f0+2.5 MHz, f0+5 MHz, f0−2.5 MHz, and f0−5 MHz.

A received IF signal of 10-MHz band is A/D-converted based on a 60-MHz clock. The digitized signal is converted into data representing the spectral waveform on the frequency axis by FFT (Fast Fourier Transform), and distributed to five paths. The data of the main path passes through a BPF having a pass characteristic for the 1.2-MHz band corresponding to the transmission frequency f0 of the self station, and is then converted into data on the time axis by IFFT (Inverse Fast Fourier Transform). The signals of the remaining four paths pass through BPFs having a pass characteristic for the bands corresponding to the interference wave frequencies f0+2.5 MHz, f0+5 MHz, f0−2.5 MHz, and f0−5 MHz, and then undergo IFFT (Inverse Fast Fourier Transform). A threshold (for example, −100 dBm) is provided for the data corresponding to the interference wave frequencies f0+2.5 MHz, f0+5 MHz, f0−2.5 MHz, and f0−5 MHz to determine the presence/absence of an interference wave. For a frequency for which the presence of an interference wave has been determined, using the frequency spectrum of the transmission wave of the other station acquired in advance, the frequency spectrum of the interference wave is calculated from the input level of the transmission frequency f1 of the other station. The interference wave is subtracted and removed from the data corresponding to the transmission frequency f0 of the self station. Note that the amplitude or phase is corrected as needed upon subtraction processing. Quadrature detection is performed for the data that has undergone the interference wave removal. The received power and Doppler velocity are calculated using the separated I and Q component signals.

Example 4

FIG. 6 illustrates the processing system of a signal processing unit 17 according to Example 4. As in Example 2, interference wave frequencies are assumed to be f0+2.5 MHz, f0+5 MHz, f0−2.5 MHz, and f0−5 MHz.

A received IF signal of 10-MHz band is A/D-converted based on a 60-MHz clock. The digitized signal is separated into an I component signal and a Q component signal by quadrature detection. The separated IQ signals undergo FFT on a complex plane. The IQ spectral data are distributed to five paths. The IQ spectral data of the main path passes through a BPF having a pass characteristic for the 1.2-MHz band corresponding to the transmission frequency f0 of the self station, and is then converted into data on the time axis by IFFT (Inverse Fast Fourier Transform). The IQ spectral data of the remaining four paths pass through BPFs having a pass characteristic for the bands corresponding to the interference wave frequencies f0+2.5 MHz, f0+5 MHz, f0−2.5 MHz, and f0−5 MHz, and then undergo IFFT (Inverse Fast Fourier Transform). A threshold (for example, −100 dBm) is provided for the data corresponding to the interference wave frequencies f0+2.5 MHz, f0+5 MHz, f0−2.5 MHz, and f0−5 MHz to determine the presence/absence of an interference wave. For a frequency for which the presence of an interference wave has been determined, using the frequency spectrum of the transmission wave of the other station acquired in advance, the frequency spectrum of the interference wave is calculated from the input level of the transmission frequency f1 of the other station. The interference wave is subtracted and removed from the data corresponding to the transmission frequency f0 of the self station. Note that the amplitude or phase is corrected as needed upon subtraction processing.

The received power and Doppler velocity are calculated using the IQ signals that have undergone the interference wave removal.

As described above, according to the embodiment, a received IF signal is distributed to the main path and at least one other path. A signal of a band corresponding to the transmission frequency of another radio station is extracted from the signal of the other path, and a signal extracted from the signal of the main path is removed or subtracted. This makes it possible to reliably remove an interference wave even when a signal from another radar site or the like is mixed into the received signal as an interference wave. It is therefore possible to improve the sensitivity of the received signal and accurately measure the received power and Doppler velocity.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A weather radar apparatus comprising:
    a transmitting/receiving unit configured to transmit a radar wave of a first transmission frequency to an observation target and receive a reflected wave;
    a distribution unit configured to distribute a received signal of the reflected wave to a main path and at least one sub path;
    an extraction unit configured to extract a component, as a main path signal, from the signal distributed to the main path, the component corresponding to the first transmission frequency, and also to extract, from the signal distributed to said at least one sub path, an interference wave signal based on at least one second transmission frequency which is used by a radio station; and
    a removing unit configured to remove the interference wave signal extracted from a signal of the main path.

2. The apparatus according to claim 1, wherein the removing unit adjusts at least one of an amplitude and a phase of the interference wave signal, and subtracts the interference wave signal from the received signal.

3. The apparatus according to claim 1, wherein the extraction unit gives, to the signal of said at least one sub path, an oscillation signal corresponding to said at least one second transmission frequency.

4. The apparatus according to claim 1, wherein the extraction unit comprises a filter which passes, out of the signal of the at least one sub path, a frequency band corresponding to said at least one second transmission frequency.

5. The apparatus according to claim 1, wherein the extraction unit extracts a frequency band corresponding to said at least one second transmission frequency from a signal obtained by converting the signal of said at least one sub path into a frequency component.

6. The apparatus according to claim 1, wherein the extraction unit performs quadrature detection of the signal of said at least one sub path, and extracts a frequency band corresponding to said at least one second transmission frequency from a signal obtained by converting the signal of said at least one sub path into a frequency component on a complex plane.

7. A method used in a weather radar apparatus which transmits a radar wave of a first transmission frequency to an observation target and receives a reflected wave, comprising:
    distributing a received signal of the reflected wave to a main path and at least another path;
    extracting, from a signal of the other path, an interference wave signal from a radio station; and
    removing the interference wave signal extracted from a signal of the main path.

8. The method according to claim 7, wherein in removing, at least one of an amplitude and/or a phase of the interference wave signal is adjusted, and the interference wave signal is subtracted from the received signal.

9. The method according to claim 7, wherein in extracting, an oscillation signal corresponding to an at least one second transmission frequency of the radio station is given to the signal of the other path.

10. The method according to claim 7, wherein in extracting, a filter having a pass characteristic for, out of the signal of the other path, a frequency band corresponding to a transmission frequency of the other radio station is used.

11. The method according to claim 7, wherein in extracting, a frequency band corresponding to a transmission frequency of the radio station is extracted from a signal obtained by converting the signal of the other path into a frequency component.

12. The method according to claim 7, wherein in extracting, quadrature detection of the signal of the other path is performed, and a frequency band corresponding to a transmission frequency of the other radio station is extracted from a signal obtained by converting the signal of the other path into a frequency component on a complex plane.

* * * * *